United States Patent [19]

Hogan, Jr.

[11] 4,366,970

[45] Jan. 4, 1983

[54] THEFT PREVENTION METHOD AND APPARATUS FOR WELLHEADS

[76] Inventor: Robert J. Hogan, Jr., Rte. 1, Mobeetie, Tex. 79061

[21] Appl. No.: 178,365

[22] Filed: Aug. 15, 1980

[51] Int. Cl.³ ............................................. F16L 13/02
[52] U.S. Cl. ........................................ 285/45; 285/80; 285/286
[58] Field of Search ...................... 285/45, 80, 15, 286

[56] References Cited

U.S. PATENT DOCUMENTS

| | | | |
|---|---|---|---|
| 725,290 | 4/1903 | Speer | 285/80 X |
| 968,759 | 8/1910 | Fogg | 285/45 X |
| 1,154,960 | 9/1915 | Baruch | 285/80 X |
| 1,345,543 | 7/1920 | Huth | 285/286 |
| 1,814,412 | 7/1931 | Rutten | 285/80 X |
| 2,307,148 | 1/1943 | McGuire | 285/286 X |
| 2,699,960 | 1/1955 | Callery et al. | 285/45 X |
| 2,858,114 | 10/1958 | Parris | 285/45 X |
| 4,300,373 | 11/1981 | Camos et al. | 285/80 X |

FOREIGN PATENT DOCUMENTS

| | | | |
|---|---|---|---|
| 930606 | 7/1955 | Fed. Rep. of Germany | 285/286 |
| 886641 | 7/1943 | France | 285/45 |
| 758616 | 10/1956 | United Kingdom | 285/286 |

*Primary Examiner*—Thomas F. Callaghan
*Attorney, Agent, or Firm*—Nathaniel A. Humphries

[57] ABSTRACT

A flange juncture of a wellhead is protected by first and second stainless steel clam shell closure members of substantially identical construction which are positioned over the flange juncture and welded by stainless steel welding procedures to preclude external access to the holding bolts of the flange juncture so as to prevent the unauthorized disconnection of the flange juncture and the theft of wellhead components attached thereto.

1 Claim, 6 Drawing Figures

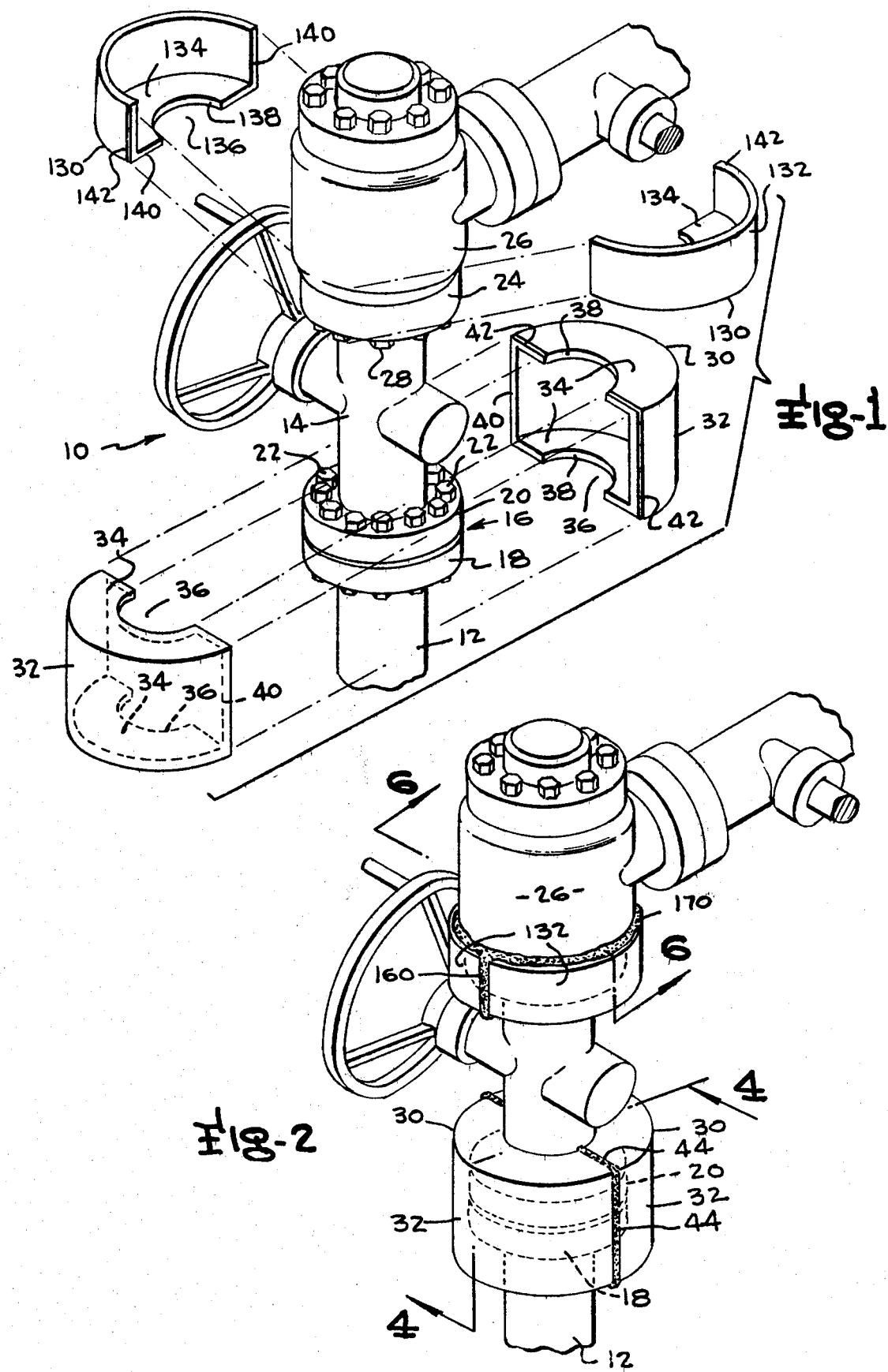

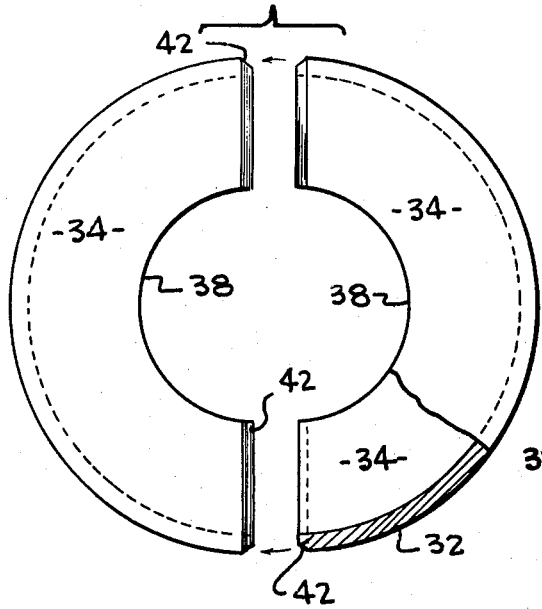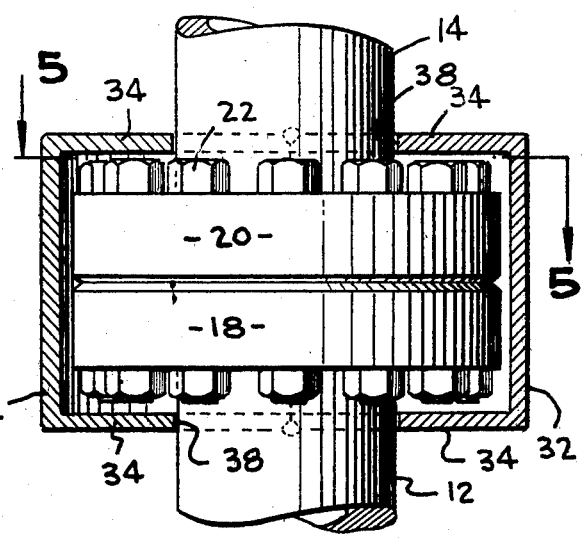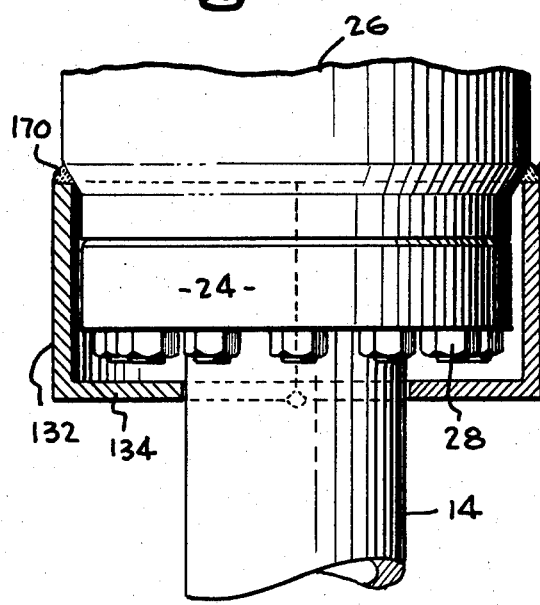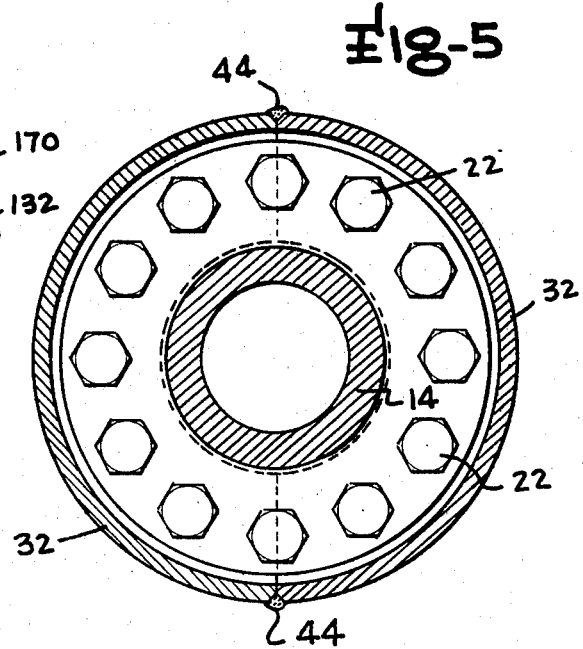

THEFT PREVENTION METHOD AND APPARATUS FOR WELLHEADS

BACKGROUND OF THE INVENTION

The present invention is in the field of oil well equipment and is more specifically directed to means for preventing the theft of valves and other expensive equipment from oil and gas wellheads.

Wellheads for oil and gas wells frequently include expensive valves and accessories which are worth many thousands of dollars. Unfortunately, it is a simple matter for a person having experience with oil field equipment to remove the valving and other equipment from a wellhead in a few minutes for purposes of theft and subsequent resale. Moreover, the problem of wellhead theft has increased in recent years due to the higher cost of the equipment and the large number of production wells located in remote areas not readily susceptible to continuous surveilance. The theft of such wellhead equipment is frequently effected by the thief driving up to the well in a pick-up truck or the like, turning off the main valve and removing the nuts and bolts from the connector flange assembly for the remaining components which are then placed in the truck and removed from the scene in four or five minutes. When one considers the fact that valves such as those employed in high pressure wells can easily exceed $25,000.00 in cost, the problems facing petroleum producers from potential theft of wellhead equipment are easily appreciated. The policing of oil and gas fields is extremely difficult due to the fact that wells are frequently visited by maintenance workers who remove valving and other equipment in the normal course of their employmental functions and the actions of the thief, even if observed, are usually not noticed as being out of the ordinary.

Prior known devices have been suggested for preventing theft or malicious damage to various types of equipment such as exemplified by U.S. Pat. Nos. 1,185,049; 1,192,342; 2,357,777; 2,511,906; 3,185,336; 3,291,148; and 3,776,412. However, devices of the foregoing types are not applicable to the protection of wellhead equipment. For example, protective shrouds and the like formed of conventional steel are easily cut with a torch so that they do not provide any substantial amount of protection against theft.

Therefore, it is the primary object of this invention to provide a new and improved apparatus and method for preventing the theft of wellhead equipment.

SUMMARY OF THE INVENTION

Achievement of the foregoing object is enabled by the preferred embodiment for practice of the invention which consists of first and second matching stainless steel, clam shell housing halves which are dimensioned and shaped to be fittable around the flange junction between a valve and other components of the wellhead. The clam shell members have facing surfaces which can be welded together by the use of stainless steel electrodes. Each of the housing halves includes an opening at each end having a peripheral extent of approximately 180° so that the two openings of the two members when positioned together effectively provide a complete opening encircling the pipe extending from the flange junction so that upon welding of the component halves together, the flange junction is completely protected and the retaining bolts are inaccessible to thieves. While it is theoretically possible for an ambitious thief to remove the protective housing by the use of an electrical arc gouge electrode or by sawing, the use of such expedients is difficult and relatively time consuming. The protective housing cannot be removed by more conventional oxy-acetylene cutting apparatus due to the fact that it is formed of stainless steel which does not lend itself to such a cutting operation.

The present invention consequently achieves the object of the invention in a relatively simple manner at a relatively low cost when compared with the cost of the equipment being protected. A better understanding of the preferred embodiment will be achieved when the following detailed description is considered in conjunction with the appended drawings in which like reference numerals are used for the same parts as shown in the different figures of the drawings.

BRIEF DESCRIPTION OF THE DRAWINGS

FIG. 1 is an exploded perspective view of first and second embodiments for practice of the invention as associated with a wellhead;

FIG. 2 is a perspective view illustrating the components of FIG. 1 in attached position on the wellhead;

FIG. 3 is a top plan view of the first embodiment of the invention;

FIG. 4 is a sectional view taken along lines 4—4 of FIG. 2;

FIG. 5 is a sectional view taken along lines 5—5 of FIG. 4; and

FIG. 6 is a sectional view taken along lines 6—6 of FIG. 2.

DESCRIPTION OF THE PREFERRED EMBODIMENT

Attention is initially invited to FIG. 1 of the drawings which illustrates a conventional wellhead 10 including a vertical pipe 12 to which a valve 14 is connected by a flange juncture 16 comprising a pipe flange 18 on the upper end of vertical pipe 12 and a valve flange 20 on the lower end of the body of the valve 14. Flanges 18 and 20 are held together in a well known manner by bolt and nut means 22. Similarly, a second valve flange 24, which is connected to a block tee 26 by bolt and nut means 28. It should be understood that the pipe 12 is connected to the well by means of a main cutoff valve which is not shown. Consequently, the valve 14 can be removed by simply closing the main shutoff valve and disconnecting the bolt members 22 so that the valve 14 and equipment such as block tee 26 attached to it can be easily removed by a thief. The present invention is directed to means which will preclude or substantially impede removal of the valve 14 etc. Similarly, the present invention also includes means which would preclude removal of the block tee 26 from flange 24.

The first embodiment of the invention comprises first and second housing halves in the form of clam shell closure members 30 which are formed of stainless steel and are of identical construction with each including a cylindrical wall portion 32 and first and second end walls 34. The end walls 34 are in parallel spaced planes and each include a semi-circular opening 36 formed of a cylindrical surface 38 having a peripheral extent of approximately 180°. Openings 36 are dimensioned to matingly fit over the wellhead components on opposite sides of the flange juncture 16 which consists of the upper end of pipe 12 and the lower portion of the valve 14. It should also be observed that the clam shell closure members 30 have facing surfaces 40 which are beveled at 42 and which are positioned together and welded along weld lines 44 by the use of stainless steel electrodes in a conventional welding process. The completed assembly is shown in the bottom portion of FIG. 2.

The second embodiment, which is illustrated in the upper portion of FIG. 1, is for protectively enclosing the bolts 28 of the upper flange 24 to preclude loosening of such bolts for removal of the components 26, etc. The second embodiment comprises first and second clam shell members 130 each having a cylindrical wall portion 132 and an end wall 134. End wall 134 is provided with an end opening 136 defined by a cylindrical surface 138 having a peripheral extent of approximately 180°. End wall 134 is identical to end wall 34 of the first embodiment. Facing surfaces 140 are provided in the clam shell enclosures 130 with the upper end of the enclosures being defined by the upper edge extent 142 of the cylindrical wall portion 132. In use, the two clam shell enclosure members 130 are positioned with their facing surfaces 140 engaging each other and with the opening 136 extending about the upper portion of valve body 14 below the bolts 28. The structure is welded in place by welds 160 formed by conventional stainless steel welding procedures joining the facing surfaces 140 and by an upper peripheral weld 170 joining the upper end 142 to the body of the tee block 26 as shown in FIGS. 2 and 6. Thus, the positioning of the second embodiment clearly precludes removal of the bolts 28 of the flange juncture between flange 24 and the block tee 26. The welding procedures are enhanced by the provision of bevel surfaces 142 adjacent the facing surfaces 140.

Therefore, it will be seen that the present invention provides a simple and reliable means for protecting wellhead components so as to substantially reduce the possibility of theft therefrom. Numerous modifications of the disclosed embodiments will undoubtedly occur to those of skill in the art, and it should therefore be understood that the spirit and scope of the invention is to be limited solely by the appended claims.

I claim:

1. A wellhead including a flange juncture joining first and second wellhead components, first and second stainless steel clam shell closure members of substantially identical construction with each clam shell closure member including a beveled facing surface, a purely cylindrical wall portion from which no other means extends outwardly therefrom and which has no inward depressions or grooves and first and second parallel end wall members oriented perpendicular to the axis of said cylindrical wall portion provided in axially spaced array and connected to said cylindrical wall portion to define an internal chamber fitted over half of the flange juncture and first and second end openings provided in said end wall members and matingly fitted over approximately 180° of the periphery of the first and second wellhead components on opposite sides of the flange juncture, wherein said clam shell closure members matingly fit over the flange juncture to cooperatively provide enclosure of the flange juncture and a permanent stainless steel welding connection effected along the facing surfaces of said clam shell closure members.

* * * * *